United States Patent [19]

Chueh

[11] Patent Number: 5,813,769
[45] Date of Patent: Sep. 29, 1998

[54] STEERING BEARING ASSEMBLY FOR A BICYCLE

[76] Inventor: Hung-Che Chueh, 3rd Flr., No. 398, Ta Tun 6th St., Taichung, Taiwan

[21] Appl. No.: 897,481

[22] Filed: Jul. 21, 1997

[51] Int. Cl.$^6$ .................................................. F16C 33/58
[52] U.S. Cl. ......................... 384/513; 384/537; 384/540
[58] Field of Search .................................. 384/513, 540, 384/537, 541, 489

[56] References Cited

U.S. PATENT DOCUMENTS

| | | | |
|---|---|---|---|
| 5,291,797 | 3/1994 | Chi | 384/540 |
| 5,319,993 | 6/1994 | Chiang | 384/545 |
| 5,454,281 | 10/1995 | Chi | 384/540 |

*Primary Examiner*—Lenard A. Footland
*Attorney, Agent, or Firm*—Holland & Hart LLP

[57] ABSTRACT

A steering bearing assembly includes a lower race disposed to an end of a head tube through which a steerer tube extends, a handlebar stem mounted to the steerer tube, and an upper race disposed to the lower race with a ball bearing set rotatably received therebetween. The upper race has a neck portion extending upwardly therefrom which has at least two gaps defined longitudinally therein, a fastener securely mounted to the neck portion so as to position the steerer tube extending through the neck portion and the fastener is pushed downwardly by the handlebar stem.

3 Claims, 6 Drawing Sheets

STEERING BEARING ASSEMBLY FOR A BICYCLE

BACKGROUND OF THE INVENTION

1. Field of the Invention

The present invention relates to a steering bearing assembly for a bicycle and, more particularly, to a steering bearing assembly having an upper race which has a neck with gaps defined therein and a C-shaped fastener securely mounts to the neck to position the steerer tube extending through the upper race.

2. Brief Description of the Prior Art

FIGS. 5 and 6 show two conventional steering bearing assemblies 80, 81 of a bicycle and which are respectively disposed on two ends of a head tube 60 through which a steerer tube 50 rotatably extends. A handlebar stem 70 is fixedly mounted to a top end of the steerer tube 50 by a securing bolt means 73 so that when rotating a handlebar 76 attached to the handlebar stem 70, the steerer tube 50 together with a front fork 52 and a front wheel (not shown) turn. The steering bearing assembly 80 includes a ring 801, an upper race 82, a ball bearing set 85 and a lower race 84, wherein the ball bearing set 85 is rotatably received between the upper race 82 and the lower race 84. The upper race 82 has a tapered inner peripheral surface 821 which contacts a tapered outer peripheral surface 8010 of the ring 801 which is positioned by a downward force from the handlebar stem 70 so that the steering bearing assembly 80 is positioned. However, in order to ensure the two tapered peripheral surfaces 8010, 821 are matched with each other properly so that the ball bearing set 85 can be smoothly operated, the two tapered peripheral surfaces 8010, 821 have to be manufactured precisely which results in high manufacturing cost.

The present invention intends to provide an improved steering bearing assembly to mitigate and/or obviate the above-mentioned problems.

SUMMARY OF THE INVENTION

The present invention provides a steering bearing assembly for a bicycle which comprises a head tube and a steerer tube extending through the head tube with the steering bearing assembly being disposed between the head tube and the steerer tube, and a handlebar stem mounted to the steerer tube extending from the steering bearing assembly. The steering bearing assembly comprises a lower race having a flange extending radially from a top edge thereof so as to be disposed on one of two ends of the head tube, an upper race having a skirt portion extending radially therefrom and a neck portion extending upwardly from the skirt portion wherein the neck portion has at least two gaps defined longitudinally therein, a ball bearing set rotatably received between the skirt portion and the lower race, and a fastener securely mounted to the neck portion and being pushed downwardly by the handlebar stem.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
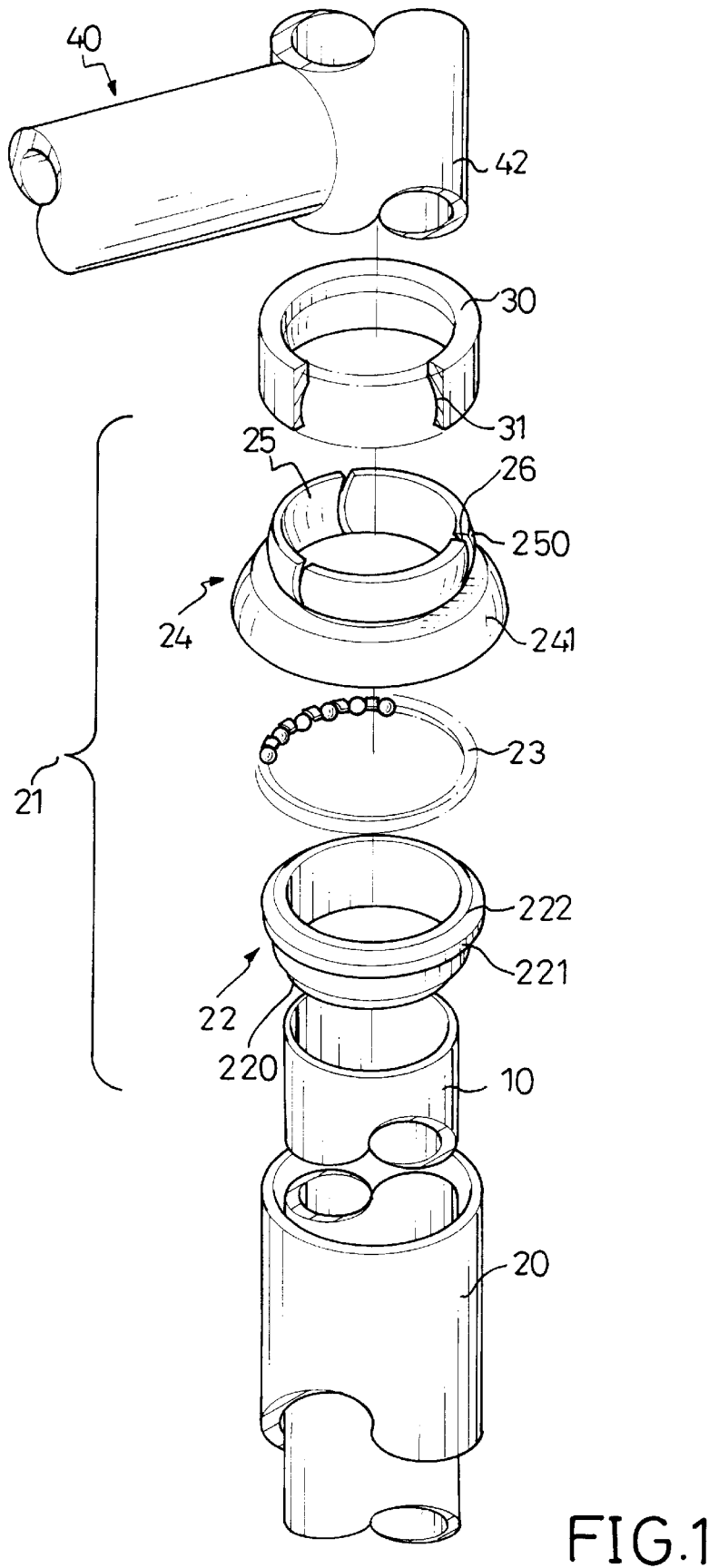
FIG. 1 is a exploded, perspective view, partly in section, of a steering bearing assembly in accordance with the present invention disposed to a head tube of a bicycle.
Figure 2:
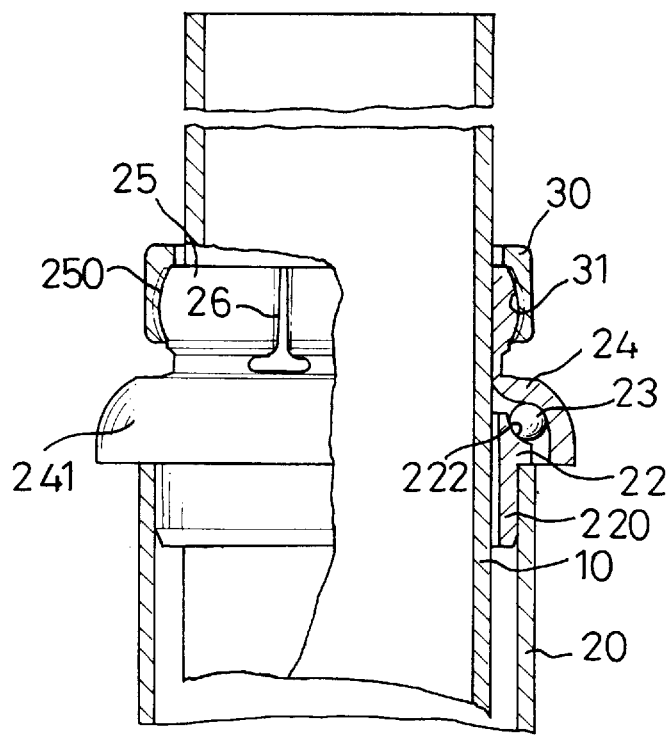
FIG. 2 is a side elevational view, partly in section of the steering bearing assembly in accordance with the present invention.
Figure 3:
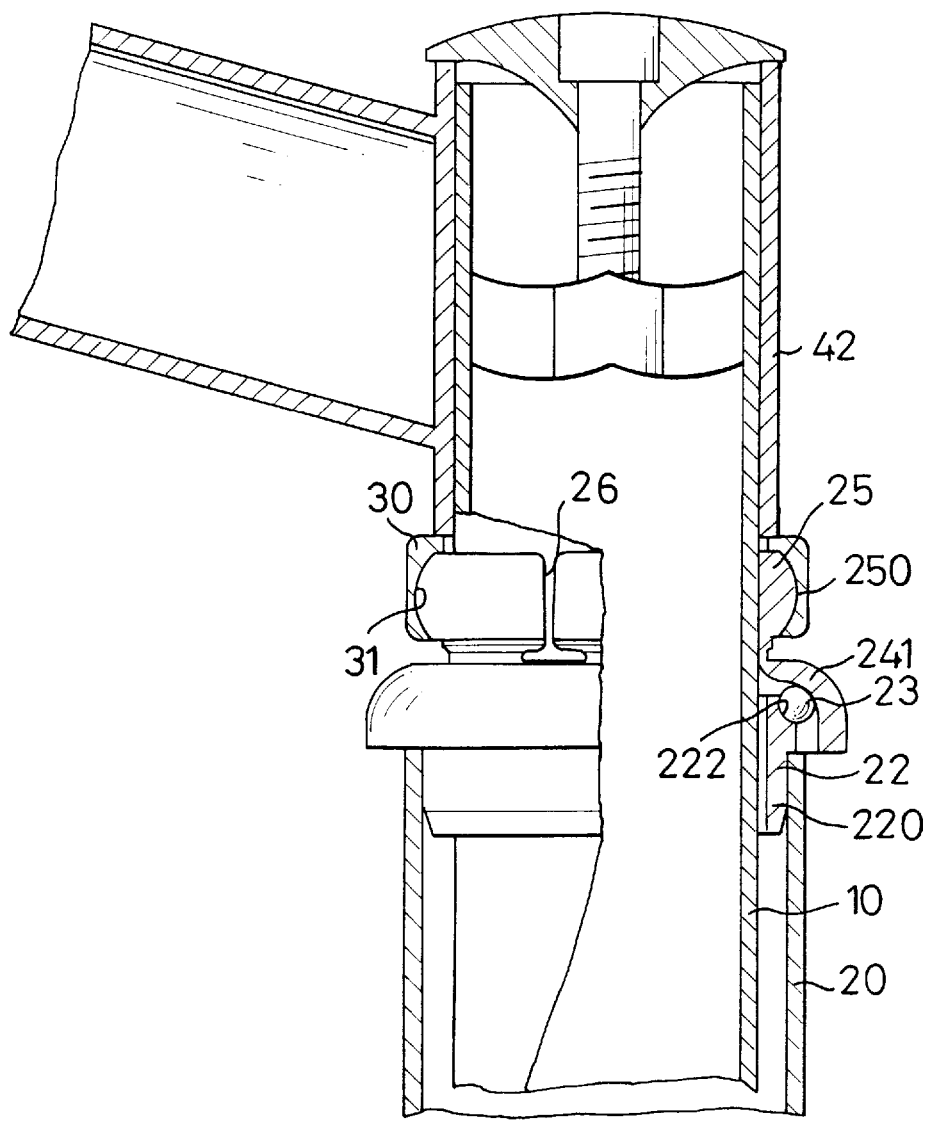
FIG. 3 is a side elevational view, partly in section, of the steering bearing assembly disposed to the head tube with a handlebar stem mounted to a steerer tube extending from the head tube.

Referring to FIGS. 1 through 3, a bicycle generally comprises a frame having a head tube 20 through which a steerer tube 10 rotatably extends by two steering bearing assemblies 21 (only one is shown) respectively disposed to two ends of the head tube 20 and located between the head tube 20 and the steerer tube 10 so that the steerer tube 10 can be rotated within the head tube 20. A handlebar stem 40 includes a first end which receives a handlebar (not shown) and a second end which has a connector 42 which is securely mounted to the steerer tube 10 extending from the head tube 20.

The steering bearing assembly 21 in accordance with the present invention generally includes a lower race 22 having an insert portion 220 inserted into the head tube 20 and a flange 221 extending radially from a top edge of the insert portion so as to be disposed on one of two ends of the head tube 20. The lower race 22 has a groove 222 defined in a top thereof. An upper race 24 includes a skirt portion 241 extending radially therefrom and a neck portion 25 extending upwardly from the neck portion 25. The neck portion 25 has at least two gaps 26 defined longitudinally therein so that the neck portion 25 can be deformed slightly when under pressure. A ball bearing set 23 is rotatably received between the skirt portion 241 and the groove 222 of the lower race 22. A ring-shaped fastener 30 having a central hole is securely mounted to the neck portion 25 to position the steerer tube 10 extending through the head tube 20.

The neck portion 25 has a convex outer periphery 250 protruding radially and outwardly therefrom and the fastener 30 has a concave inner periphery 31. An upper surface of the fastener 30 has a smaller periphery defining the central hole and a lower surface of the fastener 30 has a larger periphery defining the central hole, the larger periphery defining the central hole is slightly smaller than that of an outer diameter of the convex outer periphery 250 of the neck portion 25 so that the fastener 30 is able to be mounted to the neck portion 25 and securely receives the convex outer periphery 250 of the neck portion 25 within the concave inner periphery 31 of the fastener 30. The neck portion 25 has the gaps 26 so that when the fastener 30 is mounted to the neck portion 26, the neck portion 26 will be deformed slightly to firmly retain the steerer tube 10. The fastener 30 is pushed downwardly by the connector 42 so that the upper race 24 is positioned.

Accordingly, the ball bearing set 23 is properly positioned between the skirt portion 241 of the upper race 24 and the groove 222 of the lower race 22 by a downward force from upper race 24 which is indirectly pushed by the connector 42 of the handlebar stem 40. The steerer tube 10 is tightly received within the neck portion 25 of the upper race 24 by the fastener 30.

Figure 4:
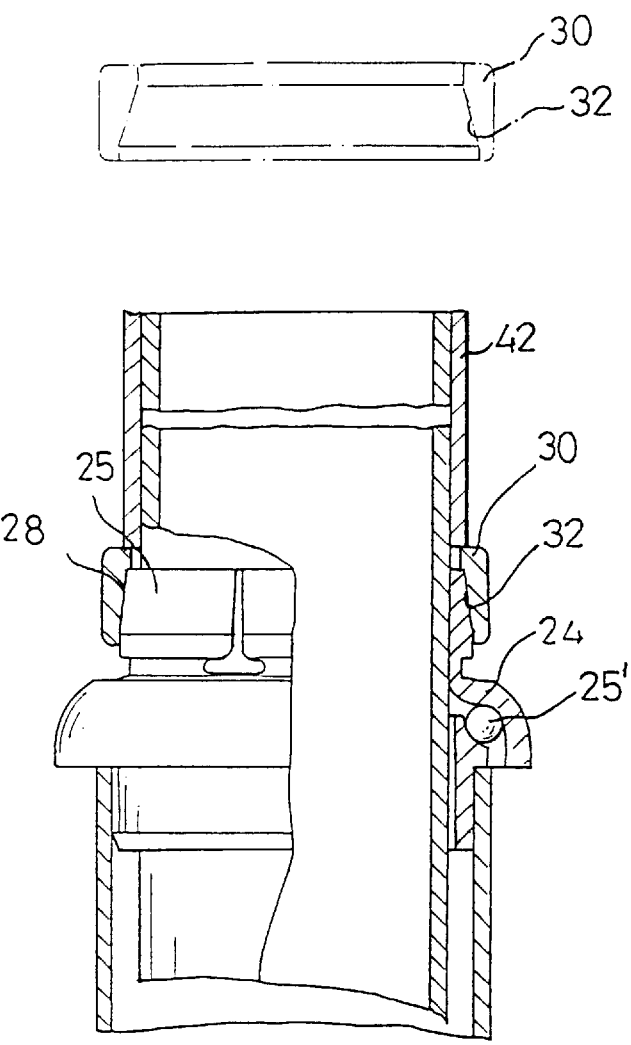
FIG. 4 is a side elevational view, partly in section, of another embodiment of the steering bearing assembly.
Figure 5:
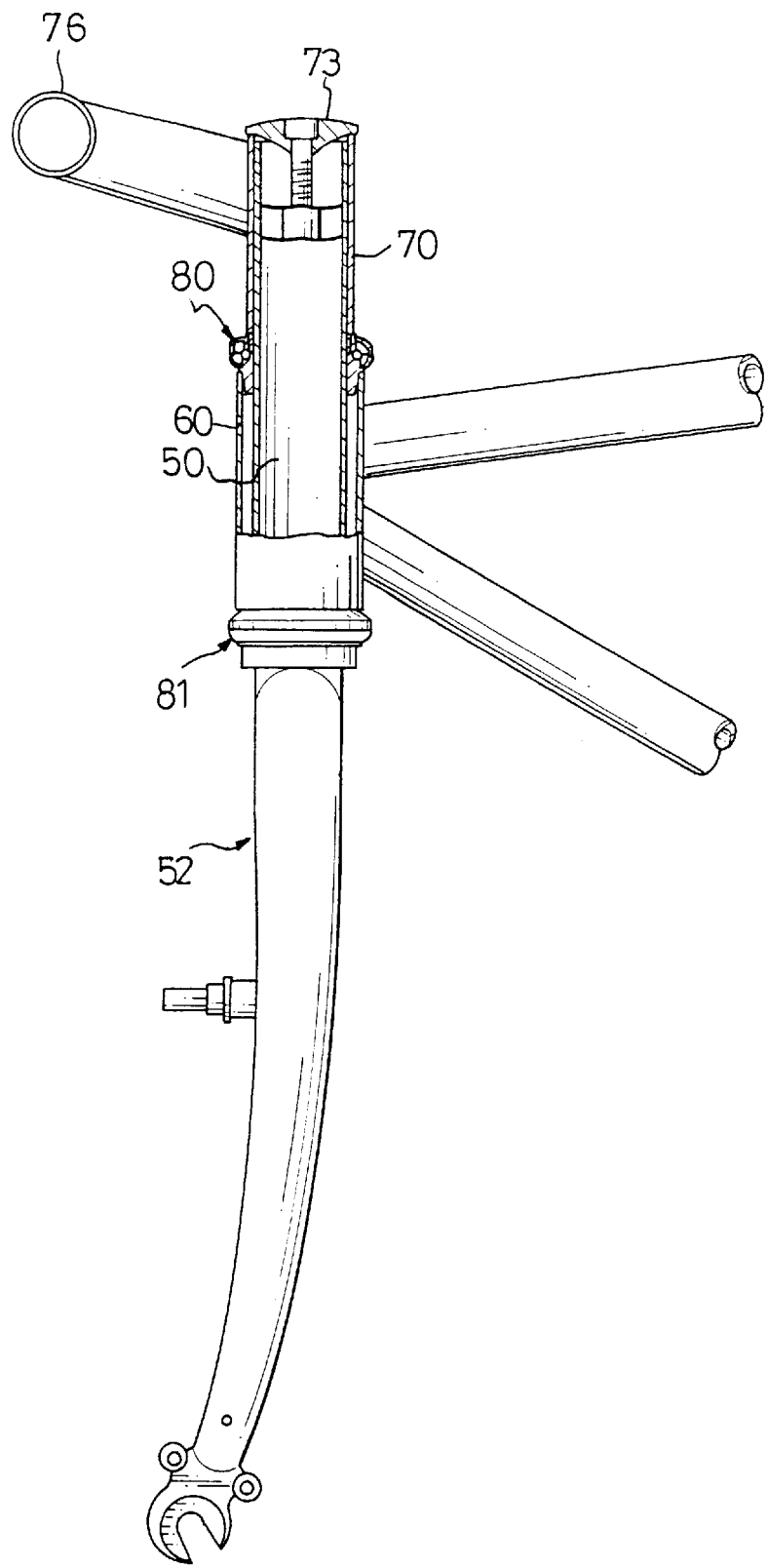
FIG. 5 is a side elevational view, partly in section, of a conventional steering bearing assembly disposed to a head tube of a bicycle.
Figure 6:
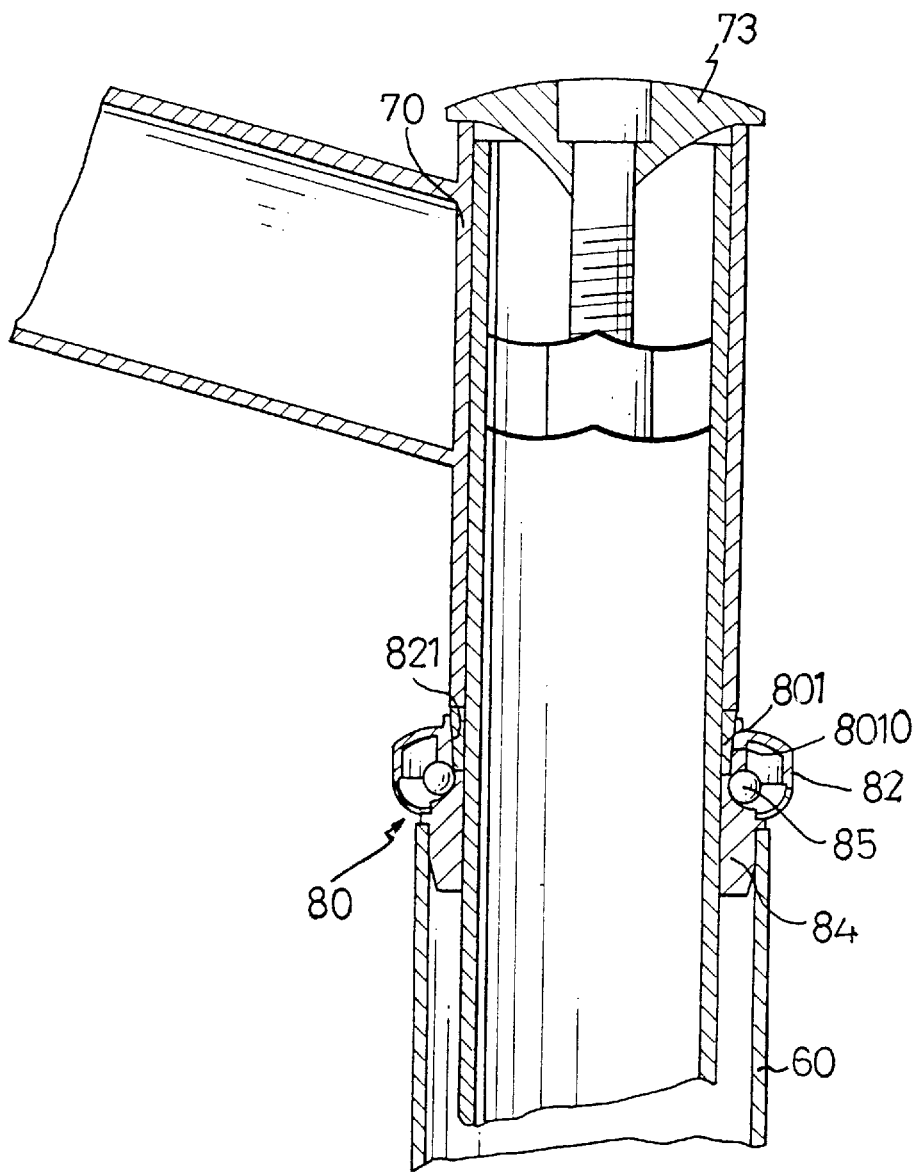
FIG. 6 is a side elevational view, partly in section and in an enlarged scale, of the conventional steering bearing assembly shown in FIG. 5 with a handlebar stem disposed to a steerer tube.

FIG. 4 shows another embodiment of the present invention wherein the neck portion 25 of the upper race 24 has a tapered outer periphery 28 and the fastener 30 has a tapered inner periphery 32 which matches the tapered outer periphery 28 of the neck portion 25 so that when the connector 42 pushes downwardly to the fastener 30, the upper race 24 and the ball bearing set 25 are properly positioned.

Although the invention has been explained in relation to its preferred embodiment, it is to be understood that many other possible modifications and variations can be made without departing from the spirit and scope of the invention as hereinafter claimed.

What is claimed is:

1. A steering bearing assembly for a bicycle which comprises a frame having a head tube and a steerer tube extending through said head tube with said steering bearing assembly being disposed between said head tube and said steerer tube, a handlebar stem mounted to said steerer tube extending from said head tube, said steering bearing assembly comprising:

a lower race, said lower race having a flange extending radially from a top edge thereof so as to be disposed on one of two ends of said head tube;

an upper race having a skirt portion extending radially therefrom and a neck portion extending upwardly from said skirt portion, said neck portion having at least two gaps defined longitudinally therein;

a ball bearing set rotatably received between said skirt portion and said lower race, and a fastener securely mounted to said neck portion and being pushed downwardly by said handlebar stem to position said steerer tube extending through said neck portion.

2. The steering bearing assembly as claimed in claim 1, wherein said neck portion has a convex outer periphery extending radially and outwardly therefrom and said fastener has a concave inner periphery so as to receive said convex outer periphery of said neck portion.

3. The steering bearing assembly as claimed in claim 1, wherein said neck portion has a tapered outer periphery and said fastener has a tapered inner periphery which matches said tapered outer periphery of said neck portion.

* * * * *